US012675342B1

(12) United States Patent (10) Patent No.: US 12,675,342 B1
Bochenkov et al. (45) Date of Patent: Jul. 7, 2026

(54) SYSTEMS AND METHODS FOR PROACTIVE AND PREDICTIVE POWER CONSUMPTION REDUCTION DURING WORKLOAD EXECUTION

(71) Applicant: CTRL IQ, Inc., Albany, CA (US)

(72) Inventors: Ani Fox Bochenkov, Lorentzweiler (LU); Arthur Francis Tyde, III, Reno, NV (US); David Dickerson, La Habra, CA (US); Yoshiaki Matsumoto, Kyoto (JP)

(73) Assignee: CTRL IQ, Inc., Albany, CA (US)

( * ) Notice: Subject to any disclaimer, the term of this patent is extended or adjusted under 35 U.S.C. 154(b) by 0 days.

(21) Appl. No.: 19/338,131

(22) Filed: Sep. 24, 2025

Related U.S. Application Data

(63) Continuation of application No. 19/268,457, filed on Jul. 14, 2025, now abandoned.

(60) Provisional application No. 63/827,167, filed on Jun. 20, 2025.

(51) Int. Cl.
| | |
|---|---|
| *G06F 9/50* | (2006.01) |
| *G06F 1/3246* | (2019.01) |
| *G06F 11/30* | (2006.01) |
| *G06F 11/34* | (2006.01) |

(52) U.S. Cl.
CPC .......... *G06F 9/5088* (2013.01); *G06F 1/3246* (2013.01); *G06F 9/5094* (2013.01); *G06F 11/3006* (2013.01); *G06F 11/34* (2013.01)

(58) Field of Classification Search
None
See application file for complete search history.

(56) References Cited

U.S. PATENT DOCUMENTS

| | | | |
|---|---|---|---|
| 2015/0286262 A1* | 10/2015 | Park .................. | G05D 23/1917 |
| | | | 713/320 |
| 2017/0168532 A1* | 6/2017 | Kim ........................ | G06F 1/206 |
| 2024/0291725 A1* | 8/2024 | Murgai ................. | H04L 41/147 |
| 2025/0298452 A1* | 9/2025 | Byrne ....................... | G06F 1/28 |

* cited by examiner

*Primary Examiner* — Eric C Wai
(74) *Attorney, Agent, or Firm* — Ansari Katiraei LLP; Arman Katiraei; Sadiq Ansari

(57) ABSTRACT

Disclosed is a controller and associated methods for proactively and predictively managing temperature and energy usage of different system processors running different workloads. The controller receives telemetry data from a particular processor. The controller deploys a workload to the particular processor and configures dynamic thresholds for the particular processor based on the telemetry data identifying a threshold temperature at which the particular processor is throttled. The dynamic thresholds restrict the particular processor to an upper frequency that is less than the maximum frequency supported by the particular processor and that avoids reaching the threshold temperature. The controller shifts the workload from used cores of the particular processor to under-utilized or unused cores of the particular processor in response to a temperature of the particular processor violating a dynamic threshold of the dynamic thresholds. The controller executes the workload across the under-utilized or unused cores according to the dynamic thresholds.

19 Claims, 10 Drawing Sheets

$$C_{power}/Unit_{work} < B_{power}/Unit_{work} <$$
$$A_{power}/Unit_{work} < D_{power}/Unit_{work}$$

Power state 3 (VoltageX, FrequencyY)

90% match

Power state 3 (VoltageX, FrequencyY) -> Power state 4 (VoltageA, FrequencyB)

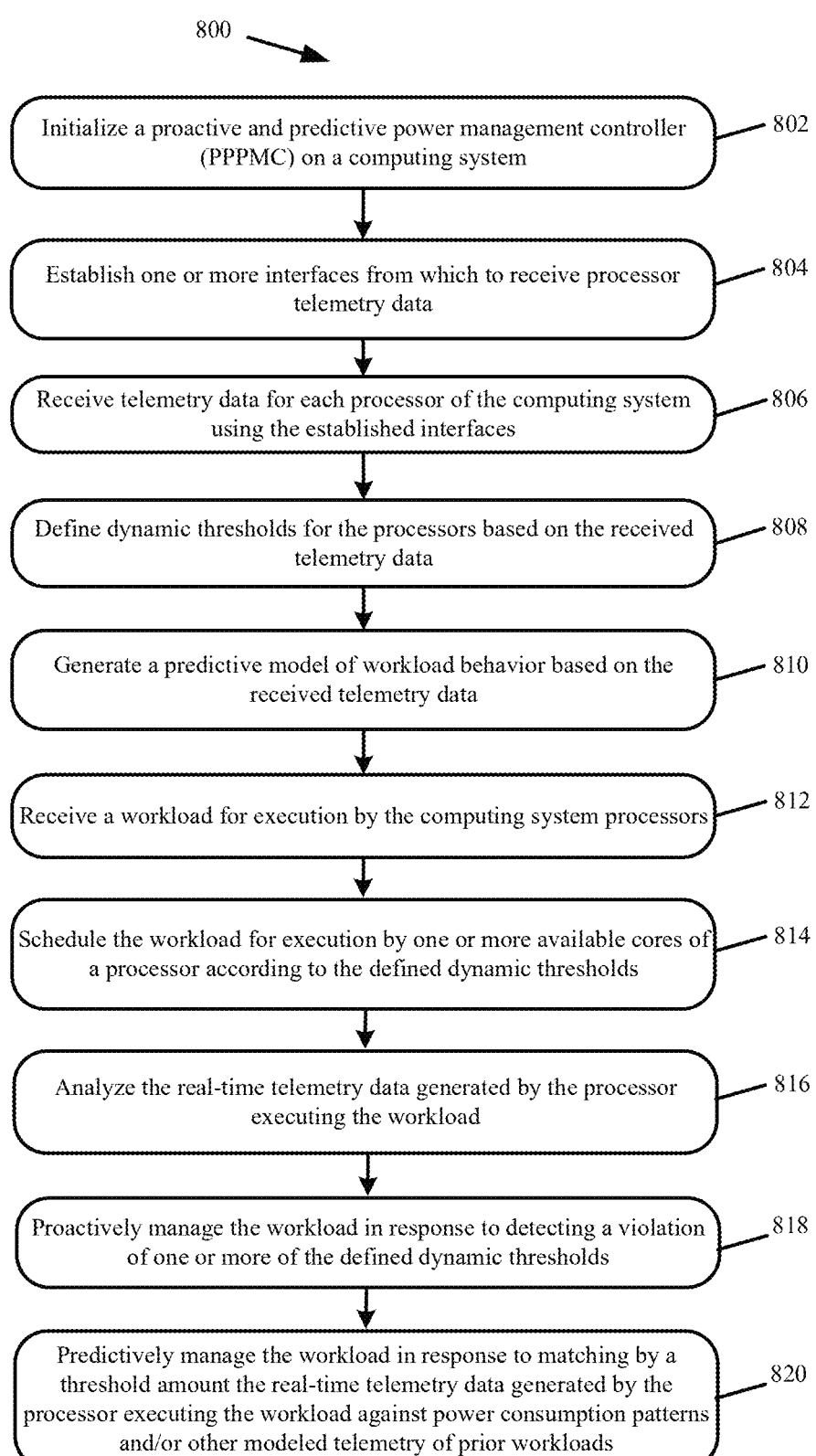

800

Initialize a proactive and predictive power management controller (PPPMC) on a computing system — 802

Establish one or more interfaces from which to receive processor telemetry data — 804

Receive telemetry data for each processor of the computing system using the established interfaces — 806

Define dynamic thresholds for the processors based on the received telemetry data — 808

Generate a predictive model of workload behavior based on the received telemetry data — 810

Receive a workload for execution by the computing system processors — 812

Schedule the workload for execution by one or more available cores of a processor according to the defined dynamic thresholds — 814

Analyze the real-time telemetry data generated by the processor executing the workload — 816

Proactively manage the workload in response to detecting a violation of one or more of the defined dynamic thresholds — 818

Predictively manage the workload in response to matching by a threshold amount the real-time telemetry data generated by the processor executing the workload against power consumption patterns and/or other modeled telemetry of prior workloads — 820

FIG. 8

SYSTEMS AND METHODS FOR PROACTIVE AND PREDICTIVE POWER CONSUMPTION REDUCTION DURING WORKLOAD EXECUTION

CLAIM OF BENEFIT TO RELATED APPLICATIONS

This application is a continuation of U.S. nonprovisional application Ser. No. 19/268,457, with the title "Systems and Methods for Proactive and Predictive Power Consumption Reduction During Workload Execution", filed Jul. 14, 2025 which claims the benefit of U.S. provisional application 63/827,167, with the title "Systems and Methods for Reducing Power Consumption During Workload Execution", filed Jun. 20, 2025. The contents of application Ser. No. 19/268, 457 and 63/827,167 are hereby incorporated by reference.

BACKGROUND

Processors and operating systems have reactive thermal control and/or power management tools to prevent heat related failures. The reactive thermal control and/or power management tools are typically tuned to maximize system performance. For instance, a processor is operated at its maximum operational frequency or is temporarily boosted (e.g., overclocked) past its maximum operational frequency when presented with a processor-intensive workload. Once the temperature of the processor or system reaches a certain threshold, the reactive thermal control and/or power managements tools may throttle and reduce the operational frequency of the processor or may temporarily shut down the processor or one or more of its cores until temperatures return to within acceptable thresholds.

The switching between maximum operational frequencies and lower frequencies for thermal management is inefficient for servers and/or other high performance computing systems that are under continuous load. Switching back-and-forth between the different frequencies or power states may reduce the overall number of operations or execution cycles that are performed by the processors over time relative to operating the processors at a constant high frequency without throttling. Moreover, operating the processors at their maximum or boosted frequencies and switching between different processor operational states also consumes more overall power (e.g., more power consumed per clock cycle) than running the processors at a constant high frequency without throttling or frequency adjustment. Another disadvantage of the reactive thermal control and/or power management tools is increased processor failure rates. Regularly hitting the processor's thermal thresholds or limits and scaling back increases wear and/or the chance for individual gates or other processor components to fail.

Accordingly, there is a need for proactive and predictive thermal control and/or power management tools that improve overall processor efficiency by continually running the processors at a high frequency that does not result in throttling or repeated switching between lower and higher operational frequencies, that reduces power consumption by maintaining the processors in a constant operational state that minimizes the power per cycle usage, and that prolongs the processor life by reducing the number of times the processor's thermal thresholds or limits are reached, thereby reducing wear on the processor gates and components. Proactive and predictive thermal control and/or power management tools may increase workload efficient by up to 20%, reduce energy usage up to 40% on high performance computing systems under continual load with less than 2% performance loss, and/or provide up to 15 degrees Celsius of die-level thermal improvement.

BRIEF DESCRIPTION OF THE DRAWINGS

FIG. 8 presents a process for proactively and predictively managing processor power consumption in accordance with some embodiments presented herein.

DETAILED DESCRIPTION OF PREFERRED EMBODIMENTS

Figure 1:
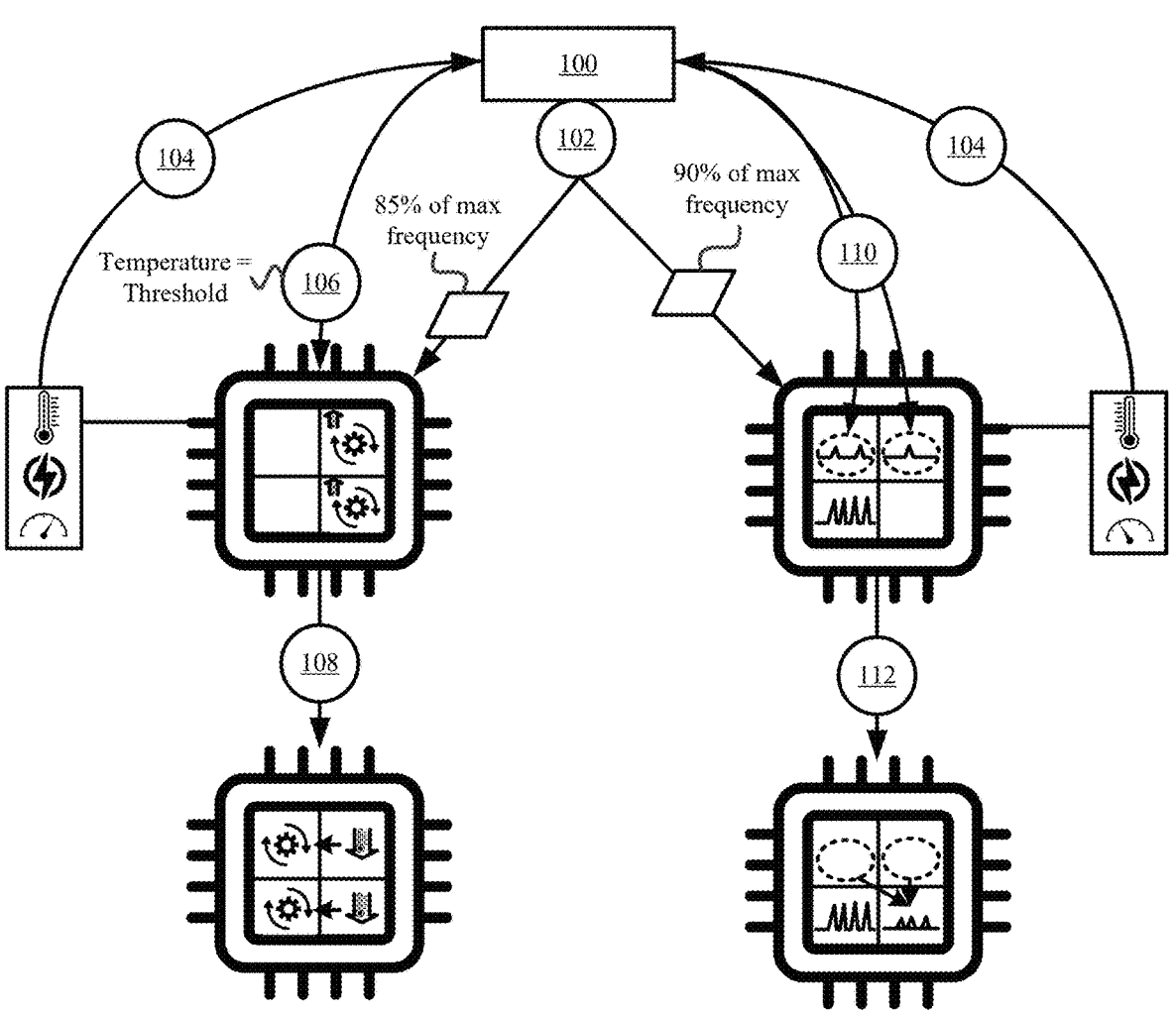
FIG. 1 illustrates an example of proactively reducing power consumption and maintaining consistent processor performance in real-time for executing workloads in accordance with some embodiments presented herein.

The following detailed description refers to the accompanying drawings. The same reference numbers in different drawings may identify the same or similar elements.

Disclosed are systems and methods for proactive and predictive power consumption reduction during workload execution. The systems and methods includes a proactive and predictive power management controller (PPPMC) that proactively and predictively controls temperature and energy usage for different processors running different workloads across different operating system (OS) environments (e.g., UNIX®, LINUX®, Windows®, MacOS®, and/ or other OSes). The PPPMC provides the proactive and predictive control and management for Central Processing Units (CPUs), Graphics Processing Units (GPUs), Accelerated Processing Units (APUs), Neural Processing Units (NPUs), and/or other generalized or specialized processors of the computing system running the PPPMC. In other words, the PPPMC consolidates the operation of separate thermal control and/or power management tools for different processors and/or different types of processors of the same computing system.

The PPPMC monitors power consumption and thermal properties of different processors in real-time, and sets dynamic thresholds that cause each processor to operate at a constant high frequency that avoids throttling, excess energy usage associated with maximum or overclocked operational frequencies, and that reduces the processor meantime to failure by reducing processor wear. The dynamic thresholds are derived to override default thresholds that allow the processors to reach their thermal limits and be throttled. The dynamic thresholds are generated from the real-time monitoring and comparison of temperature, power usage, and frequency and are generated to maximize the efficiency of each processor (e.g., maximize the operations that are performed per unit of consumed power).

The PPPMC may proactively maintain the processor's operational state within the dynamic thresholds by actively management thermal zones and migrating workloads from used cores to unused cores, by consolidating workloads associated with underutilized or idle cores into a single core, and by deactivating the underutilized or idle cores. The PPPMC may predictively maintain the processor's operational state and/or adjust the dynamic thresholds by modeling power usage associated with different workloads, identifying a current workload that matches the modeled power usage of a particular workload, and adjusting the dynamic thresholds controlling processor power usage and/or frequency in anticipation of peaks or periods of low processor utilization by the workload.

The PPPMC integrates low-level kernel controls, predictive telemetry, dynamic voltage and frequency scaling (DVFS), and task-aware clock gating to achieve up to 40% reduction in power consumption with less than 2% performance degradation and even performance improvement for certain workloads. The PPPMC may use Platform Environment Control Interface (PECI), Host Embedded Controller Interface (HECI), and other chipset integrated telemetry, DVFS orchestration, clock tree control, and process-thread awareness to intelligently, dynamically, and in real-time tune processor core usage, memory behavior, power states, and/or other functional components and states of the various system processors.

FIG. 1 illustrates an example of proactively reducing power consumption and maintaining consistent processor performance in real-time for executing workloads in accordance with some embodiments presented herein. PPPMC 100 configures (at 102) the dynamic thresholds to regulate the temperature, power usage, and/or frequency of each processor of a computing system. In some embodiments, PPPMC 100 configures (at 102) the dynamic thresholds based on prior monitoring of the processors. Each processor may have a different maximum operating frequency, a different temperature at which it throttles down from the maximum operation frequency or between different power states, and/or different amounts of power consumed at different frequencies or power states. Accordingly, PPPMC 100 may model the operational behaviors of the processors and predict the optimal operating frequency at which each processor executes the most operations or cycles without throttling and/or that maximizes the number of operations executed per unit of consumed power.

PPPMC 100 monitors (at 104) different telemetry in real-time via integrated chipsets that directly interface with the system processors. The telemetry may include temperature, power usage, frequency, power states, and/or other measurements related to the operation of each system processor. In some embodiments, PPPMC 100 receives the telemetry data via PECI, HECI, and/or other system or kernel interfaces that allow PPPMC 100 to directly obtain the telemetry data from the processor monitoring chipsets. PPPMC 100 may also receive the telemetry data from existing user-space applications or tools that monitor different telemetry for different processors.

PPPMC 100 optimizes processor execution and reduces power consumption in different ways depending on which of the configured (at 102) dynamic thresholds are subject to being violated by the monitored (at 104) telemetry. In some embodiments, PPPMC 100 may allocate a workload for execution on one or more cores of a processor. PPPMC 100 may select the number of cores to ensure that each core runs according to the configured (at 102) dynamic thresholds. For instance, each core of a specific processor may be configured to run at 80% of its maximum operational frequency in order to maximize the core's efficiency (e.g., maximize the number of operations executed by the core without the potential for throttling and/or at a frequency that optimizes power consumption per cycle or executed operation). The workload may overload a single core causing the core to run at its maximum operational frequency, whereas running the workload on three cores may result in each of the three cores running at 50% of their maximum operational frequency. Accordingly, PPPMC 100 may allocate the workload to two cores to optimize processor execution and reduce power consumption.

PPPMC 100 may detect (at 106) that a workload was allocated to run on two cores of a processor and that the processor is nearing a configured (at 102) dynamic threshold for temperature. For instance, the workload may periodically spike and increase core usage during the spikes.

To avoid throttling of the subject processor and/or inefficient core usage, PPPMC 100 moves (at 108) the workload off the allocated cores and onto previously unallocated or idle cores of the subject processor. If there are no idle cores, PPPMC 100 may move the workload off the processor to another processor on the same system or another computing system of a shared environment to allow the previously allocated cores to cool.

From the telemetry data, PPPMC 100 also identifies (at 110) underutilized and/or inefficient core usage. Different background or intermittent tasks or workloads may be allocated to different cores of a processor. The different cores draw power to remain active even if the tasks or workloads are idle for a period of time or use a fraction of the cores cycles (e.g., 2%). Keeping the cores active while idle or underutilized is an inefficient use of power.

Accordingly, PPPMC 100 shifts (at 112) the different background or intermittent tasks or workloads from the different cores to a single core and shuts down the other cores, thereby eliminating the power usage associated with keeping multiple idle or underutilized cores active and improving the work-to-power usage ratio by operating the single core at a more efficient frequency.

Figure 2:
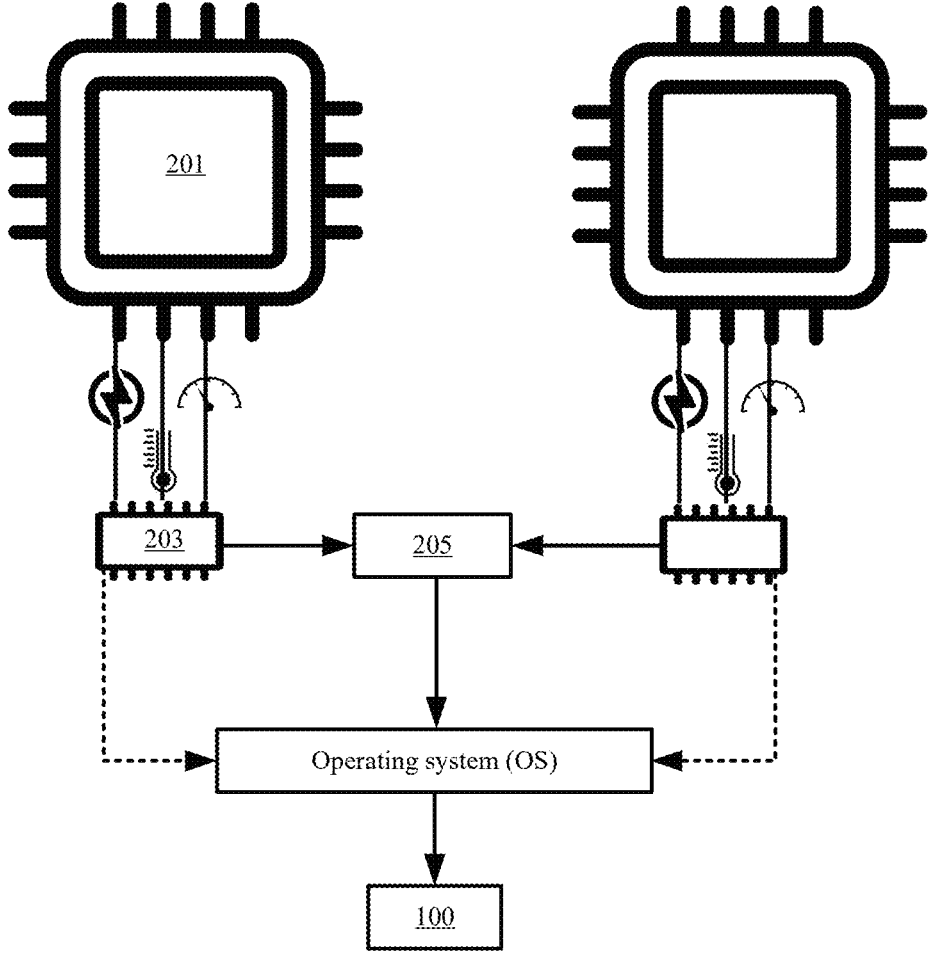
FIG. 2 illustrates an example of monitoring processor telemetry data in accordance with some embodiments presented herein.

FIG. 2 illustrates an example of monitoring the processor telemetry data in accordance with some embodiments presented herein. Processor 201 may be attached to a motherboard via compatible sockets, an add-on card that connect to a motherboard slot, and/or directly integrated into or soldered onto the motherboard. The motherboard may include one or more chipsets 203 that monitor the temperature, power consumption, frequency, power state, and/or other operational properties of processor 201. In some embodiments, processor 201 may include on-die sensors that monitor the temperature, power consumption, frequency, power state, and/or other operational properties. Super input/output chips 205 on the motherboard may aggregate the telemetry data from monitoring chipsets 203 for different system processors and/or the on-die sensors of different system processors. The PECI may be used to transfer the telemetry data from various processors to the super input/output chip. The HECI may be used to transfer the telemetry data to the host OS. OS tools such as "lm-sensors" may use kernel drivers to expose the telemetry data to the user space. In some embodiments, PPPMC 100 is a user space application that receives the telemetry data using these existing tools, interfaces, and commands (e.g., PECI, HECI, lm-sensors, etc.). In some other embodiments, PPPMC 100 is integrated as part of the OS or OS kernel and directly receives the telemetry data via the PECI, HECI, and/or other interfaces to the monitoring chipsets.

PPPMC 100 receives the telemetry data in real-time. In other words, PPPMC 100 receives the telemetry data as it is generated or made available on the monitoring chipsets, existing tools, interfaces, and/or commands. In some embodiments, PPPMC 100 periodically (e.g., every millisecond) queries for the telemetry data to have a real-time record of the processor telemetry data (e.g., temperatures, voltage or energy usage, frequency, power states, and/or measurements). In some embodiments, the telemetry data may be specified on a core-by-core basis for a multi-core processor. For instance, the measurements may specify the operating frequency or power usage of each of the processor's cores.

PPPMC 100 references the telemetry data to proactively regulate processor utilization. In particular, PPPMC 100 uses the telemetry data to reduce power usage, maintain consistent performance by eliminating processor throttling, and/or increase meantime between processor failures by preventing the processors from reaching their respective thermal thresholds.

PPPMC 100 is processor agnostic and regulates different processors and different types of processors on a computing system. For instance, PPPMC 100 may regulate utilization of one or more CPUs that are directly integrated into the system motherboard and/or one or more APUs or GPUs on separate cards or boards that are connected to the system motherboard via Peripheral Component Interconnect (PCI), PCI Express, or other interfaces.

Figure 3:
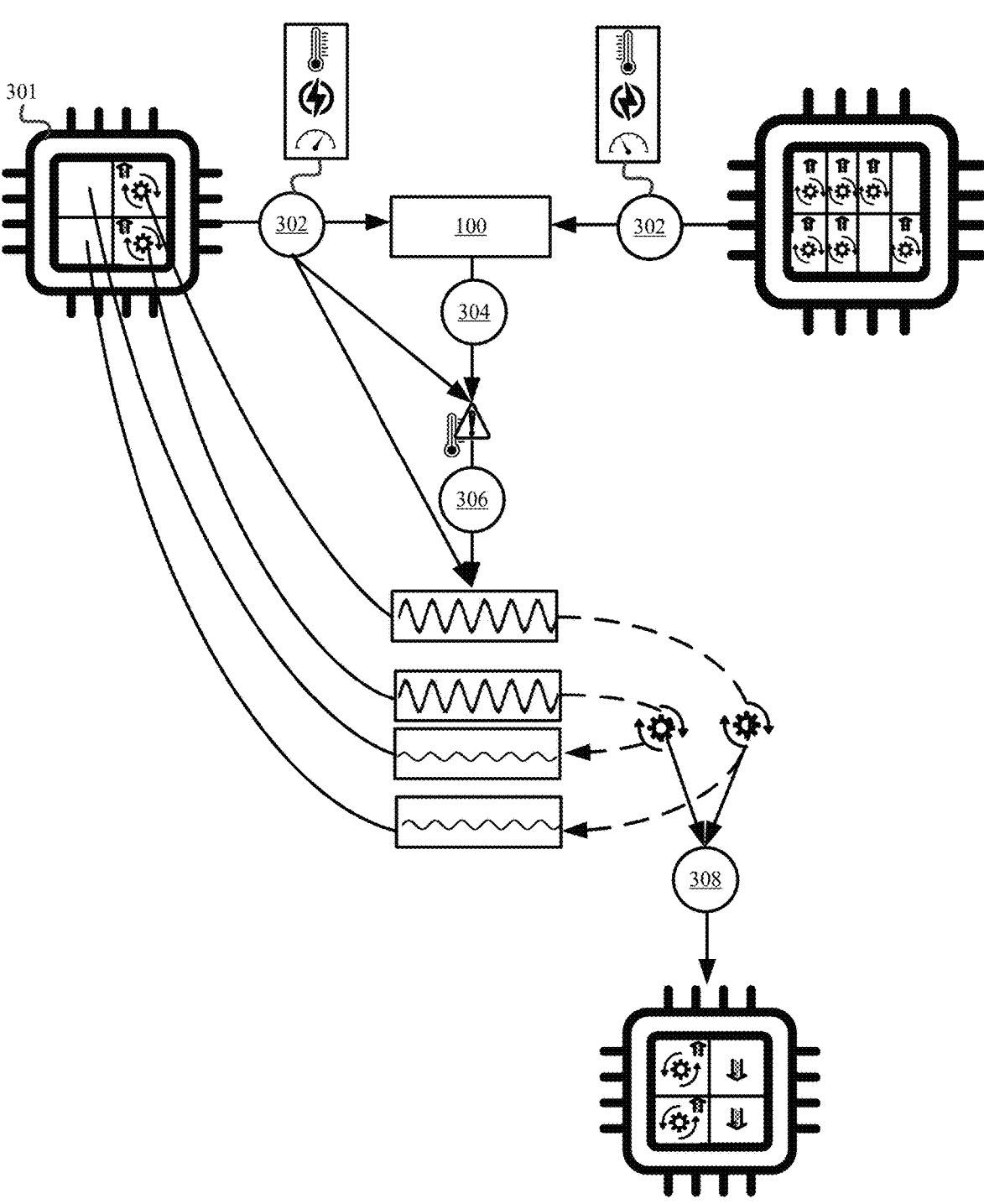
FIG. 3 illustrates an example of proactive power and thermal management in accordance with some embodiments presented herein.

FIG. 3 illustrates an example of proactive power and thermal management in accordance with some embodiments presented herein. PPPMC 100 runs on a computing system and receives (at 302) telemetry data for different processors of the computing system. The telemetry data provides PPPMC 100 with real-time temperature readings for each processor and usage data for each processor core. The usage data may be identified through operating frequency measurements obtained for the different processor cores, voltage or energy usage by the different processor cores, and/or other core-specific readings obtained by PPPMC 100.

PPPMC 100 determines (at 304) that processor 301 is a nearing a thermal threshold based on the received (at 302) telemetry data. In some embodiments, the thermal threshold is the temperature at which the processor is throttled or transitions to a reduced power state to reduce the amount of heat that is generated. PPPMC 100 may be configured with different thermal thresholds for different processors. PPPMC 100 may dynamically configure the different thermal thresholds by tracking the temperatures at which the different processors are throttled by other power management components of the OS, thermal control chips, and/or other components of the computing system. In some other embodiments, the thermal threshold corresponds to a maximum operating temperature or temperature of the processor after it continually runs at a maximum or other high frequency that may increase the failure rate of the processor over time.

PPPMC 100 detects (at 306) one or more unused cores of processor 301 based on the telemetry data. The unused cores may be identified based on their voltage or power consumption and/or their operating frequency. For instance, PPPMC 100 may obtain logical thread queues of the processor to identify which workloads are currently being executed by the processor, and may map the core utilization to the logical thread queues based on core-specific telemetry data.

PPPMC 100 moves (at 308) the workload from the used cores of processor 301 to the one or more unused cores of processor 301. In some embodiments, PPPMC 100 executes a task migration daemon within the OS scheduler to move (at 308) the workload. The one or more unused cores then execute the workload at the same frequency as the previously used cores. PPPMC 100 prevents the formation of processor thermal hot zones by moving (at 308) the workload to cooler areas of the processor. The zones or regions associated with the previously used cores are allowed to cool and dissipate heat while the zone or regions associated with the one or more unused cores begin generating more heat without having to throttle or otherwise reduce the execution rate at which the workload. In particular, PPPMC 100 performs heat balancing and energy savings in real-time via scheduler-level hoods and telemetry-fed control logic.

In some embodiments, PPPMC 100 moves (at 308) other workloads or tasks off the used cores to reduce the power consumption and/or utilization of the used cores. For instance, PPPMC 100 may identify that a first processor core performs two different workloads with a first workload spiking and disproportionately using the first processor core resources. PPPMC 100 may shift the second low-priority or low-use workload from the first processor core to a second processor core that is underutilized or tasked with performing other low-priority or low-use workloads.

In some embodiments, PPPMC 100 may move the workload off processor 301 in response to all cores of processor 301 executing some workload and the telemetry data identifying another processor of the computing system with unused cores. In some such embodiments, PPPMC 100 assumes the role of a workload scheduler and queues or rejects newly issued workloads in order to avoid exceeding the thermal envelope limits of the computing system.

Figure 4:
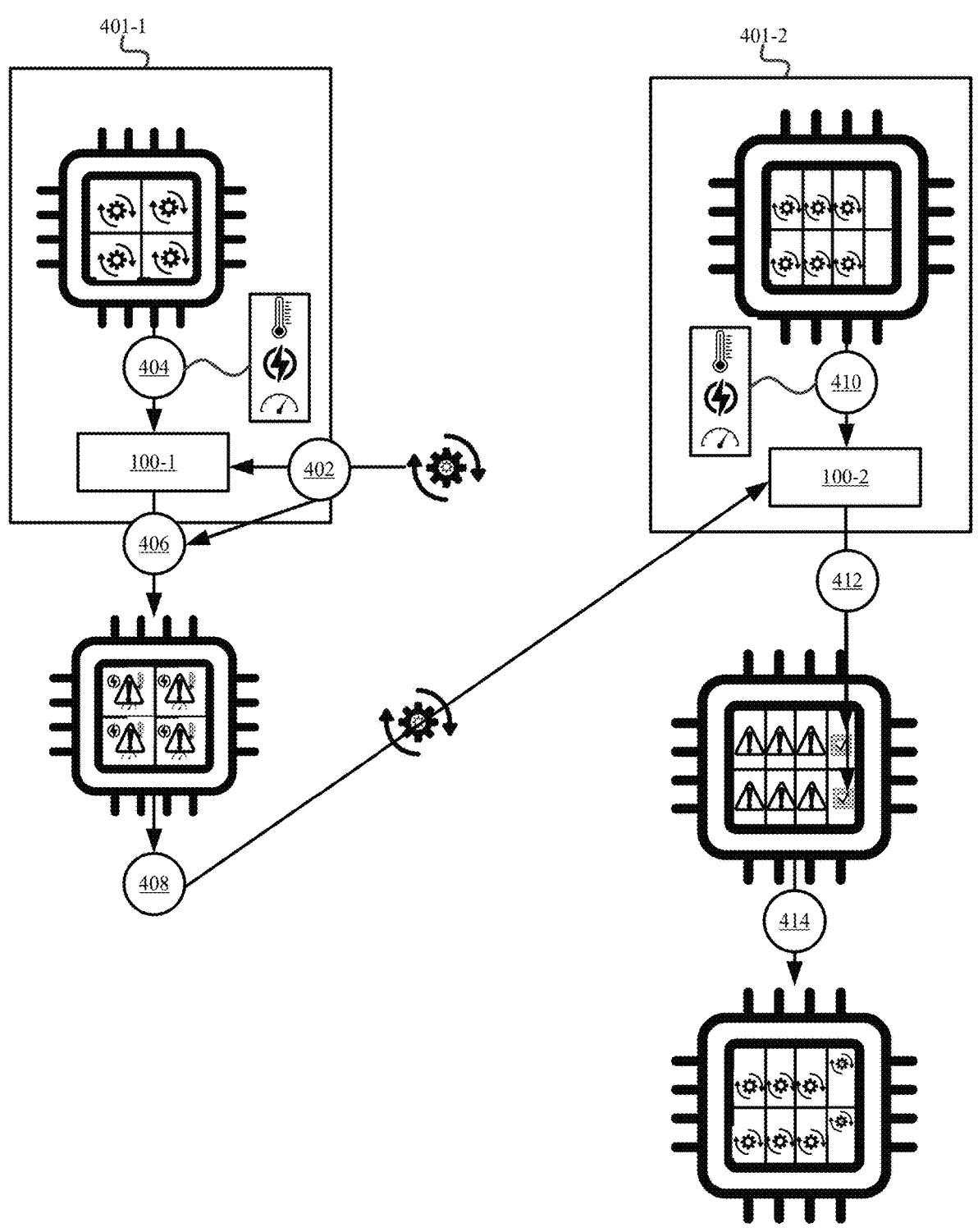
FIG. 4 illustrates an example of managing power and/or thermal budgets in a shared environment in accordance with some embodiments presented herein.

FIG. 4 illustrates an example of managing power and/or thermal budgets in a shared environment in accordance with some embodiments presented herein. PPPMC 100-1 performs the power and/or thermal management of first computing system 401-1 in the shared environment and PPPMC 100-2 performs the power and/or thermal management of second computing system 401-2 in the same shared environment. The shared environment may include a cluster of computing systems that may be used to perform different tasks or workloads and may include additional computing systems.

PPPMC 100-1 receives (at 402) a request to execute a new workload. The request may be issued by a remotely connected device that accesses the shared environment for cloud-based execution of the new workload. In some embodiments, the request is a command or instruction to deploy and execute a container, pod, executable, script, or other application using the compute resources of first computing system 401-1.

PPPMC 100-1 monitors (at 404) the power and/or thermal budget of first computing system 401-1 based on the real-time telemetry data that is obtained for each processor of first computing system 401-1. PPPMC 100-1 leverages the HECI, PECI, and/or other interfaces to receive the real-time telemetry data for the processors of first computing system 401-1.

PPPMC 100-1 implements a modified scheduler that accepts the thermal and/or other processor telemetry data as input and makes queue or migration decisions based on the telemetry data. In particular, PPPMC 100-1 determines (at 406) that executing the new workload on any of the processors or processor cores of first computing system 401-1 would cause the processors to exceed their thermal limits and result increased power consumption and reduced performance as the processors would have to run at higher frequencies which would generate more heat and cause the processors to be throttled and periodically switch between different power states because of the increased utilization.

Accordingly, PPPMC 100-1 passes (at 408) the new workload to PPPMC 100-2 for execution on second computing system 401-2. PPPMC 100-2 receives the new workload from PPPMC 100-1.

PPPMC 100-2 monitors (at 410) the power and/or thermal budget of second computing system 401-2 based on the real-time telemetry data that is obtained for each processor of second computing system 401-2, and determines (at 412) one or more processors or processor cores with the power and/or thermal budget to execute the new workload.

PPPMC 100-2 allocates (at 414) one or more of the processors or processor cores with the power and/or thermal budget for the execution of the new workload. In some embodiments, allocating (at 414) the one or more processors or processor cores includes configuring power, frequency, and thermal thresholds to execute the new workload at a consistent power efficient frequency that avoids throttling. In some other embodiments, allocating (at 414) the one or more processors or processor cores includes operating the one or more processors or processor cores at a maximum or high frequency and migrating the new workload to different cores once the processor temperature reaches a threshold.

In some embodiments, PPPMCs 100 operating in the same shared environment may be configured with means for contacting one another in order to perform the cross-node workload migration. For instance, PPPMCs 100 may access network sockets exposed by the computing system OS to connect and/or communicate with one another. In some such embodiments, PPPMCs 100 may create a mesh network across which the workloads may be distributed for execution on the different computing systems of the shared environment.

In some embodiments, PPPMC 100-1 may be configured as a primary PPPMC 100 that receives all workload requests and PPPMC 100-2 and other PPPMCs 100 in the shared environment may be configured as secondary PPPMCs 100. The primary PPPMC 100 may be tasked with scheduling the workloads across the secondary PPPMCs 100 in a manner that does not exceed the thermal limits of the different computing systems.

In some embodiments, PPPMC 100 regulates processor utilization based on power consumption telemetry data in addition to or independent of the temperature telemetry data. Power consumption may be directly or indirectly associated with the frequency at which the processor or its individual cores operate.

PPPMC 100 may restrict the power consumption to keep a processor operating efficiently. For instance, the processor may perform less work or fewer operations per unit of power consumed when operating at its maximum frequency and may perform more work or operations per unit of power consumed when operating at 80% of its maximum frequency. The increased efficiency resulting from the lower operating frequency may be due to the processor having to swap less data from its registers, perform less context switching, and/or consuming less power to operate at the lower frequency. Moreover, lower power draw may reduce the processor failure rate by reducing thermal breakdown and/or overloading of the processor circuits and components.

Figure 5:
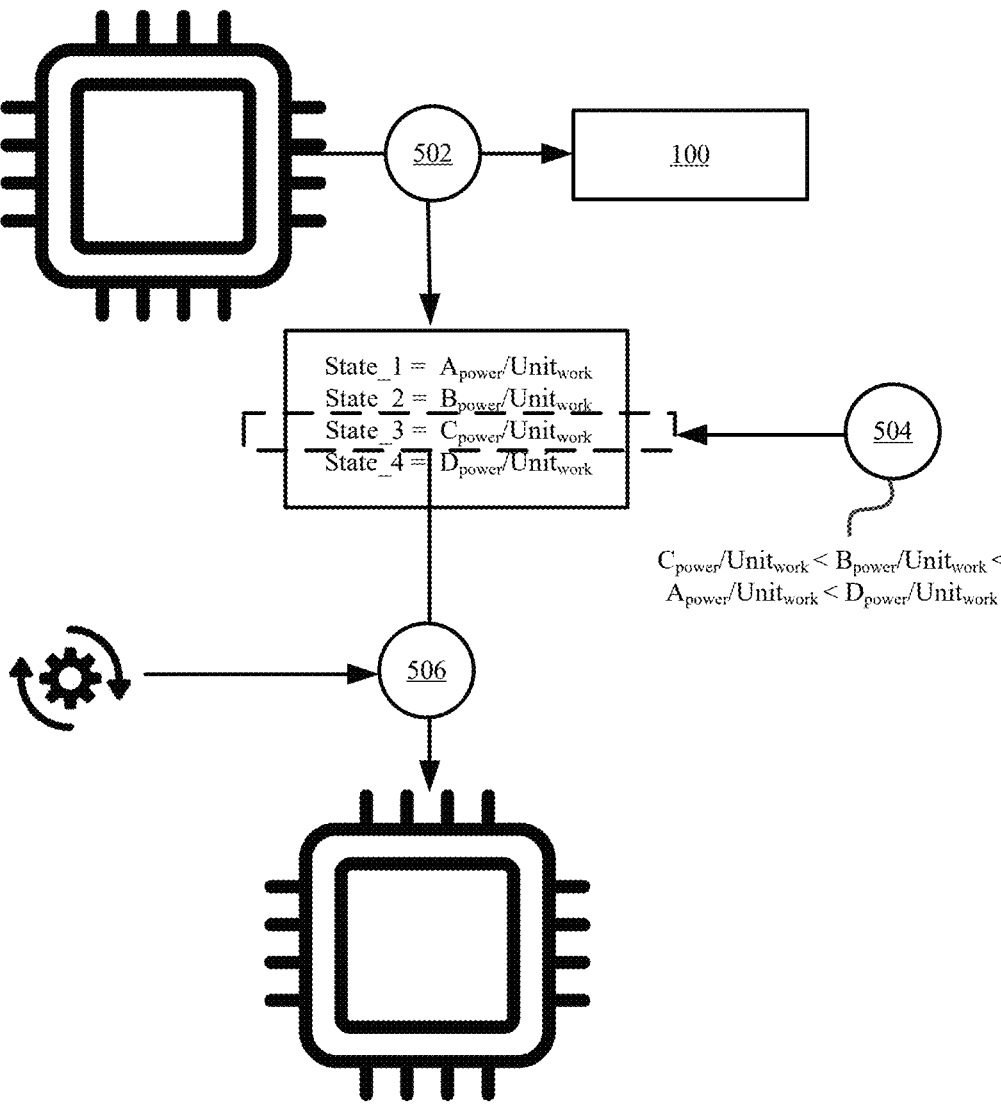
FIG. 5 illustrates an example of proactively managing workloads based on processor power utilization in accordance with some embodiments presented herein.

FIG. 5 illustrates an example of proactively managing workloads based on processor power utilization in accordance with some embodiments presented herein. PPPMC 100 tracks (at 502) the processor power efficiency at different power states based on the telemetry data. The different power states may correspond to the processor operating at different frequencies and/or at different voltages. The power efficiency is a measure of the amount of power or energy used to perform a unit of work at each power state. A unit of work may correspond to a processor cycle or operation or the completion of a task or workload. Accordingly, PPPMC 100 may track (at 502) the processor power efficiency by repeatedly executing the same workload with the processor set to different power states.

PPPMC 100 determines (at 504) the most efficient power state for the processor based on the tracked (at 502) processor power efficiency. The most efficient operating state corresponds to the operating frequency and/or voltage at which the processor performs a unit of work using the least amount of power. In some embodiments, the most efficient power state is selected from power states that operate the processor between a maximum operating frequency and/or voltage and a specified percentage of the maximum operating frequency and/or voltage (e.g., not less than 70% of the maximum operating frequency).

PPPMC 100 configures (at 506) the processor to operate at the determined efficient power state. For instance, PPPMC 100 implements DVFS control of the processor by dynamically adjusting the voltage and frequency of the processor. Traditionally, DVFS is used to lower voltage and frequency to save power when the processor is idle or running a low-priority workload and increases voltage and frequency when the processor runs a high-priority or processor-intensive workload. However, in configuring (at 506) the processor to operate at the determined efficient power state, PPPMC 100 decreases the processor voltage and frequency from the maximum voltage and frequency for a high-priority or processor-intensive workload to execute the workload at a consistent frequency that maximizes the number of operations executed by the processor per unit of power consumed by the processor. Consequently, the workload may take more time to execute but the power savings become disproportionate to the extended execution time. For instance, a 2% increase in workload execution time may yield up to a 40% reduction in power consumption.

PPPMC 100 proactively reduces power consumption during workload execution by deactivating idle processor cores and consolidating the execution of low-priority workloads across different processor cores to a single processor core. An idle processor core draws a low amount of power to remain active. A processor core may be active and idle when performing a workload that executes intermittently or that executes in response to certain triggers or conditions being met. A low-priority workload may include a task that consumes a low percentage of the processor cycles (e.g., less than 5% of the processor cycles) or one that may be executed at a fraction of the processor's maximum frequency (e.g., at less than 5% of the processor's maximum operating frequency). The execution of different low-priority workloads with different processor cores is less efficient and consumes more power than deactivating all but one of the different processor cores and running the different low-priority workloads on the single processor core. The power savings stems from powering a single clock rather multiple different clocks for the different processor cores, reducing internal switching activity, and/or powering the same execution blocks in the single core rather than redundantly powering different execution blocks that perform the same logic in the different processor cores.

Figure 6:
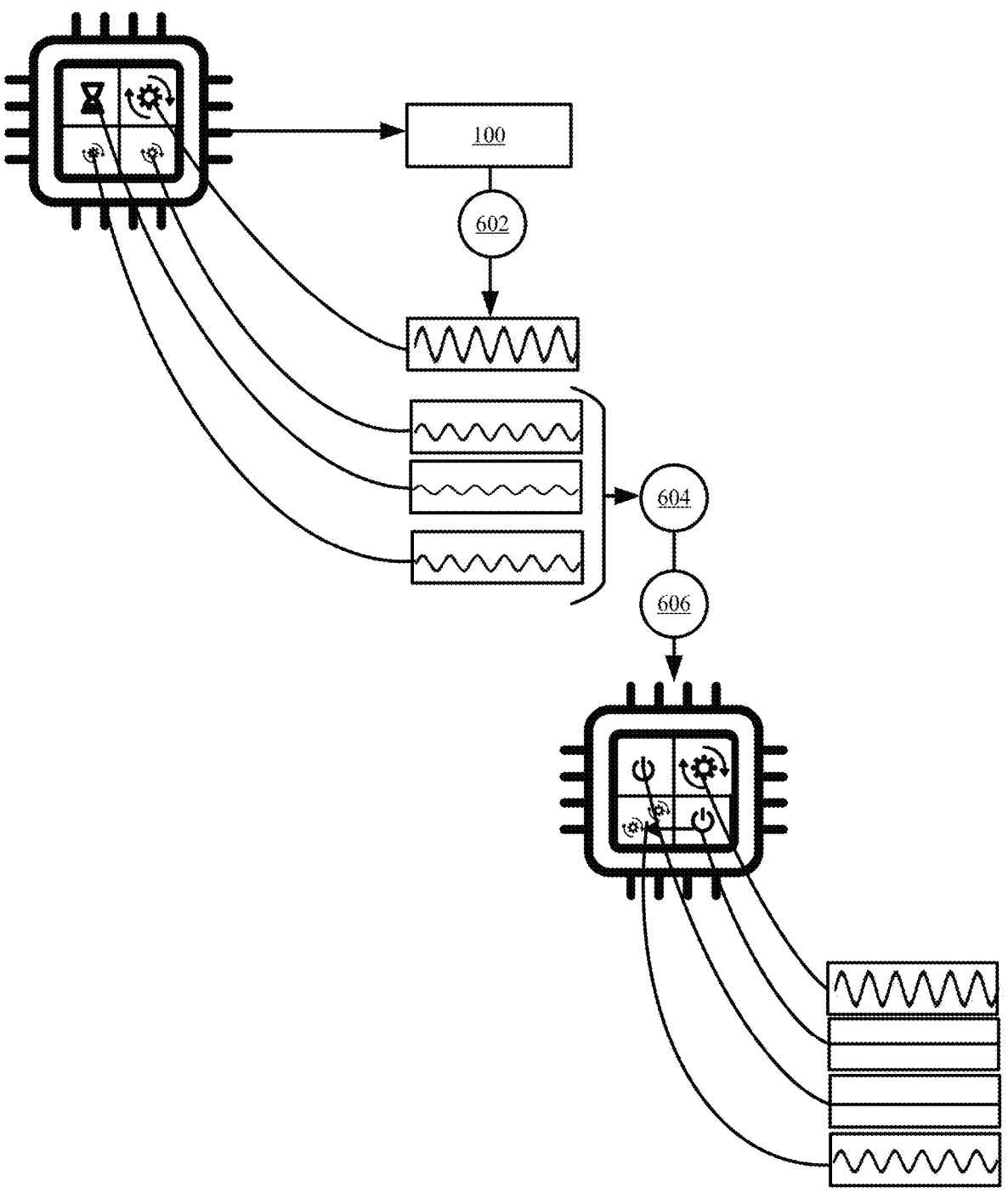
FIG. 6 illustrates an example of proactively reducing power consumption via consolidation and deactivation of idle and/or underutilized processor cores in accordance with some embodiments presented herein.

FIG. 6 illustrates an example of proactively reducing power consumption via consolidation and deactivation of idle and/or underutilized processor cores in accordance with some embodiments presented herein. PPPMC 100 receives (at 602) telemetry data for the computing system processors. The telemetry data may include temperature, energy consumption, frequency, power state, and/or other measurements. Some of the telemetry data may be core-specific. For instance, the energy consumption and/or frequency of each processor core may be measured independently.

PPPMC 100 detects (at 604) idle and/or underutilized processor cores based on the received (at 602) telemetry data. Idle and/or underutilized processor cores may include cores that operate at low voltages, that consume low amounts of power, or that operate at low frequencies. Idle and/or underutilized processor cores may also be detected (at 604) based on performance counters, interprocess communication (IPC), branch misses, and/or cache stall telemetry.

PPPMC 100 temporarily gates (at 606) the idle or underutilized processor cores via kernel-level and/or DVFS control hooks. Gating (at 606) the idle or underutilized processor cores may include moving or reassigning the tasks or workloads from the idle or underutilized processor cores to a single processor core and selectively disabling the clock signal to the idle or underutilized processor cores in order to deactivate those processor cores. The tasks or workloads may be moved based on PPPMC 100 control over the OS scheduler. In some embodiments, PPPMC 100 includes a clock gating subsystem that provides a dedicated control engine integrated into the OS and container scheduler or orchestration layer.

In some embodiments, PPPMC 100 predictively reduces power usage by a processor based on predictive models or predictive modeling of the processor energy usage, frequency fluctuations, and/or power state switching. The predictive models may track the temperatures, energy usage and/or frequencies at which different processors are throttled or switched between different power states, at which the processor efficiency decreases, and/or at which failure rates begin to increase. Moreover, the predictive models or predictive modeling may use telemetry patterns to predict workload fluctuations and adjust the temperature, power usage, and/or frequency thresholds in advance of the fluctuations. The predictive models or predictive modeling further improves upon the proactive energy reduction provided by PPPMC 100 by reducing energy use during idle or pre-peak workload phases while avoiding throttling during workload spikes. In other words, the predictive models or predictive modeling may be used to predict changing workloads or workloads with inconsistent processor utilization and optimize processor performance and/or efficiency ahead of the changes or in real-time as the changes occur.

Figure 7:
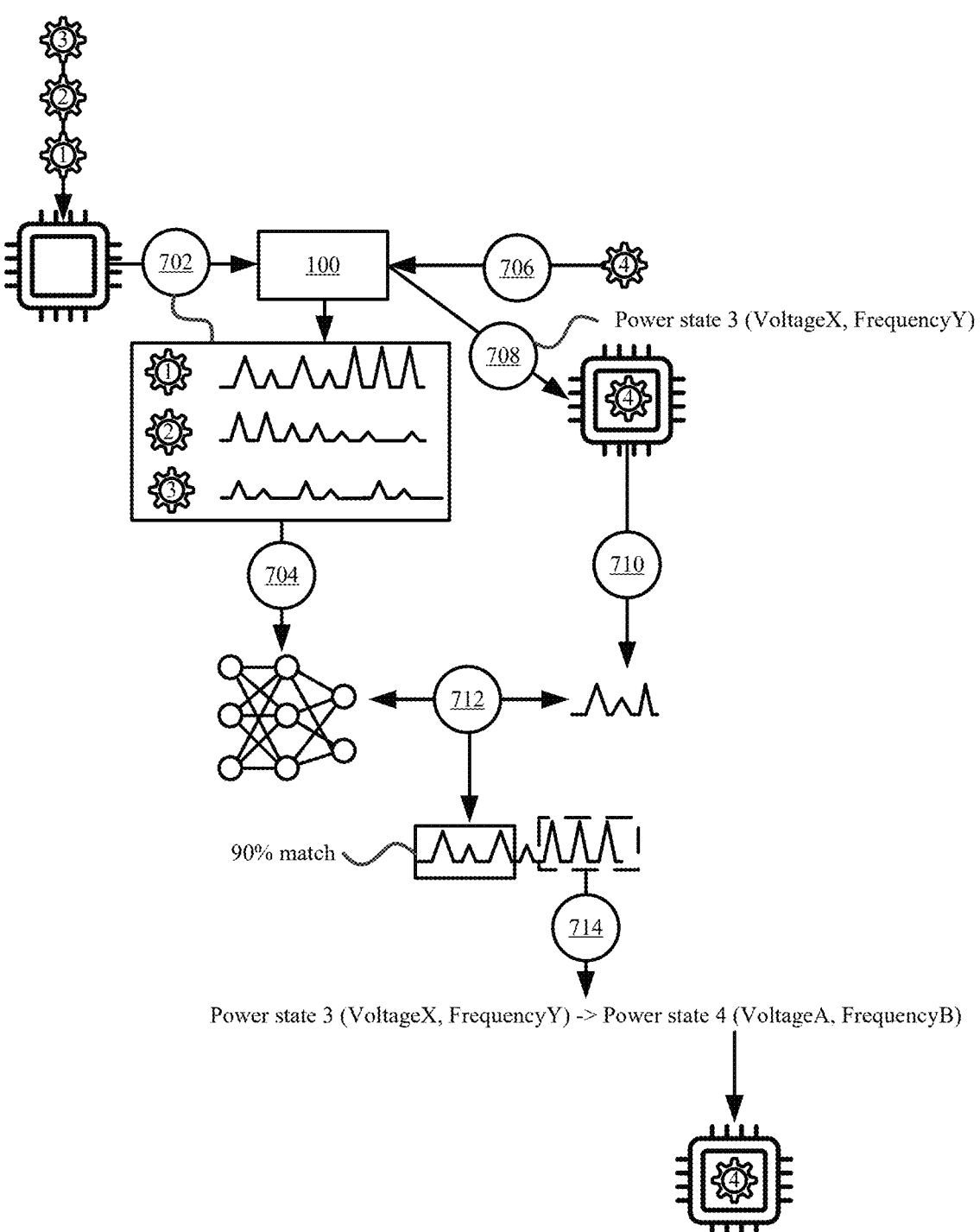
FIG. 7 illustrates an example of predictively reducing power consumption by a processor based on predictive models in accordance with some embodiments presented herein.

FIG. 7 illustrates an example of predictively reducing power consumption by a processor based on predictive models in accordance with some embodiments presented herein. PPPMC 100 receives (at 702) telemetry data regarding operation of a processor when executing different workloads over a period of time. The telemetry data monitors one or more of the processor temperature, operating frequency, power usage, and/or other metrics over the period of time including changes to the processor operational state made by the OS, other power management, or other thermal management tools when predefined thresholds are met.

PPPMC 100 models (at 704) workload behavior based on the received (at 702) the telemetry data. Modeling (at 704) the workload behavior may include inputting the telemetry data into a neural network or machine learning system and generating a predictive model based on recurring patterns in the telemetry data. The recurring patterns may be used to predict power consumption of different workloads. For instance, the power consumption associated with executing different workloads may reveal certain repeating patterns that precede specific changes in the workload behavior (e.g., usage spikes, low utilization, idle periods, intermittent usage, etc.).

PPPMC 100 receives (at 706) a new workload to schedule for execution by the one or more processors under PPPMC 100 control. PPPMC 100 configures (at 708) one or more processor cores to execute the new workload according to dynamic thresholds. The dynamic thresholds may initially be set to the same temperature, frequency, and/or power usage values for all workloads and may be adjusted in real-time based on the predictive models. For instance, PPPMC 100 may execute all workloads at 80% of the maximum frequency to avoid throttling and may adjust the frequency according to the predictive models. In some embodiments, the dynamic thresholds are based on telemetry data obtained from prior execution of the configured (at 708) processor with the dynamic thresholds being set to proactively operate the processor at a determined efficient power state and/or at frequencies or voltages that allow consistent execution without changing of the power state.

PPPMC 100 monitors (at 710) the telemetry data associated with executing the new workload for an initial period of time and compares (at 712) the monitored (at 710) telemetry data to the modeled (at 704) workload behavior. PPPMC 100 determines (at 714) that the monitored (at 710) telemetry data matches the modeled workload behavior of a particular workload or workload group. For instance, the power consumption and/or changes in power consumption by the new workload over an initial ten seconds of execution may be an 80% match to the power consumption and/or changes in power consumption for modeled artificial intelligence inference workloads. PPPMC 100 may then predict future power consumption and/or changes in the power consumption of the currently executing workload based on tracked power consumption and/or changes in the power consumption of the modeled artificial intelligence inference workloads.

PPPMC 100 adjusts (at 716) the dynamic thresholds according to the subsequent modeled power consumption of the matching particular workload or workload group. Adjusting (at 716) the dynamic thresholds may include adjusting DVFS parameters, kernel scheduling, and/or OS-level decisions to allow the processor to operate at greater or lesser frequencies and/or with greater or lesser voltage or power consumption for different parts of the new workload. By adjusting (at 716) the dynamic thresholds, PPPMC 100 may preemptively reduce energy usage during idle or pre-peak phases while avoiding throttling when load increases.

FIG. 8 presents a process 800 for proactively and predictively managing processor power consumption in accordance with some embodiments presented herein. Process 800 is implemented by PPPMC 100.

PPPMC 100 may include an application or tool for real-time automatic management of the temperature and power usage of different processors on a computing system. In some embodiments, PPPMC 100 is integrated into the kernel or as part of the computing system OS. In some other embodiments, PPPMC 100 is a standalone user-space application that interfaces with OS and/or kernel level controls of the processor thermal and power dynamics. The computing system is a device or machine with one or more processor, memory, storage, network, and/or other hardware resources.

Process 800 includes initializing (at 802) an instance of PPPMC 100 on a computing system. PPPMC 100 may be initialized as part of deploying a container, pod, virtual machine, or image on the computing system. Initializing (at 802) PPPMC 100 may include providing or configuring PPPMC 100 with root or superuser privileges. Initializing (at 802) PPPMC 100 may further include installing and/or updating required packages for PPPMC 100 to run on the computing system hardware and/or to interface with the computing system OS.

Process 800 includes establishing (at 804) one or more interfaces from which to receive processor telemetry data. Establishing (at 804) the interfaces may include installing or configuring existing tools and/or interfaces (e.g., PECI, HECI, etc.) to access the telemetry data from the monitoring chipset or other hardware monitors of the computing system. For instance, PPPMC 100 may install and configure one or more temperature monitoring tools such as Thermald, lm-sensors, Psensor, GNOME sensors applet, Hddtemp, etc. to dynamically monitor and control processor temperature, one or more power monitoring tools such as PowerTOP, TLP, upower, battop, Advanced Configuration and Power Interface (ACPI), etc. to asses processor power usage and identify processors that may be optimized, add-on or external processor management tools such as NVML to monitor and manage power states and thermal profiles for a connected GPU or other processor, and/or a frequency management tool such as cpupower and/or auto-cpufreq to enable CPU frequency scaling for balanced performance and power. Other tools that may be used to retrieve the telemetry data include perf_events for monitoring of CPU performance counters, software events, and tracepoints, OProfile for system-wide performance profiling and/or analysis, Performance Application Programming Interface (PAPI) for accessing hardware performance counters, Likwid for performance monitoring and benchmarking on x86 processors, and kernel performance monitoring frameworks such as Slurm for workload management and scheduling.

Process 800 includes receiving (at 806) the telemetry data for each processor of the computing system using the established (at 804) interfaces. The telemetry data includes temperature, frequency, power usage, power state, and/or other measurements for each processor and/or for individual processor cores.

Process 800 includes defining (at 808) dynamic thresholds for the processors based on the received (at 806) telemetry data. Defining (at 808) the dynamic thresholds includes configuring or overriding the default power and thermal management tools of the computing system to modify the processor operation. The dynamic thresholds may change the upper operating frequency of a processor to be less than the maximum supported operating frequency in response to determining that the upper operating frequency provides the most efficient operation of the processor in terms of the amount of work or operations that are performed per unit of consumed power or energy. Similarly, PPPMC 100 may define (at 808) the dynamic thresholds to restrict the upper operating frequency of the processor such that continued operation of the processor at the upper operating frequency does not cause the processor temperature to reach thresholds for throttling the processor. For instance, PPPMC 100 may monitor the processor operating at each of several different frequencies over sustained periods of time via the received (at 806) telemetry data, determine the rate at which the processor temperature increases at each of the different frequencies, determine the maximum processor temperature reached when operating at each of the different frequencies over the sustained periods of time, and define (at 808) the dynamic thresholds to maintain the processor temperature under a throttling threshold temperature by operating the processor at a fixed frequency or at each of the different frequencies for different amounts of time in response to different workload demands.

Process 800 includes generating (at 810) a predictive model of workload behavior based on the received telemetry data. Generating (at 810) the predictive model includes tracking power usage of same or similar workloads over time, determining patterns in the power usage of the same or similar workloads that precede changes in the workload demand or behavior, and producing the predictive model based on the patterns that serve as precursors to the changes in the workload demand or behavior.

Process 800 includes receiving (at 812) a workload for execution by the computing system processors. The workload may be defined in a container, pod, virtual machine, executable, image, or other executable instance. PPPMC 100 may include OS hooks to intercept the workload or override the scheduling operation of the OS.

Process 800 includes scheduling (at 814) the workload for execution by one or more available cores of a processor according to the defined (at 808) dynamic thresholds. PPPMC 100 analyzes the telemetry data to detect a processor with cores that are underutilized, idle, or some distance or percentage away from the dynamic thresholds and allocate the workload to those cores for execution. The dynamic thresholds may regulate the upper frequency at which the processor cores operate and/or specify threshold temperatures at which proactive actions are performed to allow the processor cores to consistently operate at the upper frequency without throttling.

Process 800 includes analyzing (at 816) the real-time telemetry data generated by the processor executing the workload. In particular, PPPMC 100 compares the real-time telemetry data against the dynamic thresholds and the predictive model to determine if the workload execution on the processor near violating one or more of the dynamic thresholds or if the workload execution produces telemetry data that matches to modeled behavior of a particular workload or similar set of workloads.

PPPMC 100 includes proactively managing (at 818) the workload in response to detecting a violation of one or more of the defined (at 808) dynamic thresholds. Proactively managing (at 818) the processor workloads may include moving or shifting workloads from used processor cores to unused processor cores or to different processors on the same or a different computing system in response to the processor temperature reaching or nearing a dynamic thermal threshold so that the overall processor temperature is reduced by allowing the used cores to cool and the unused cores to generate heat to rebalance the processor temperature. Proactively managing (at 818) the processor workloads may include reducing the upper operating frequency of the processor to avoid throttling in response to sustained heavy workloads that cause the processor temperature to reach or near the dynamic thermal threshold.

PPPMC 100 includes predictively managing (at 820) the workload in response to matching by a threshold amount the real-time telemetry data generated by the processor executing the workload against power consumption patterns and/or other modeled telemetry of prior workloads. Predictively managing (at 820) the workload may include adjusting voltage or frequency limits ahead of modeled changes in the workload behavior. For instance, PPPMC 100 may use DFVS to increase the voltage or frequency of the processor ahead of a modeled workload spike or to decrease the voltage or frequency ahead of the predictive model expecting the workload to become idle or reduce processor usage.

Figure 9:
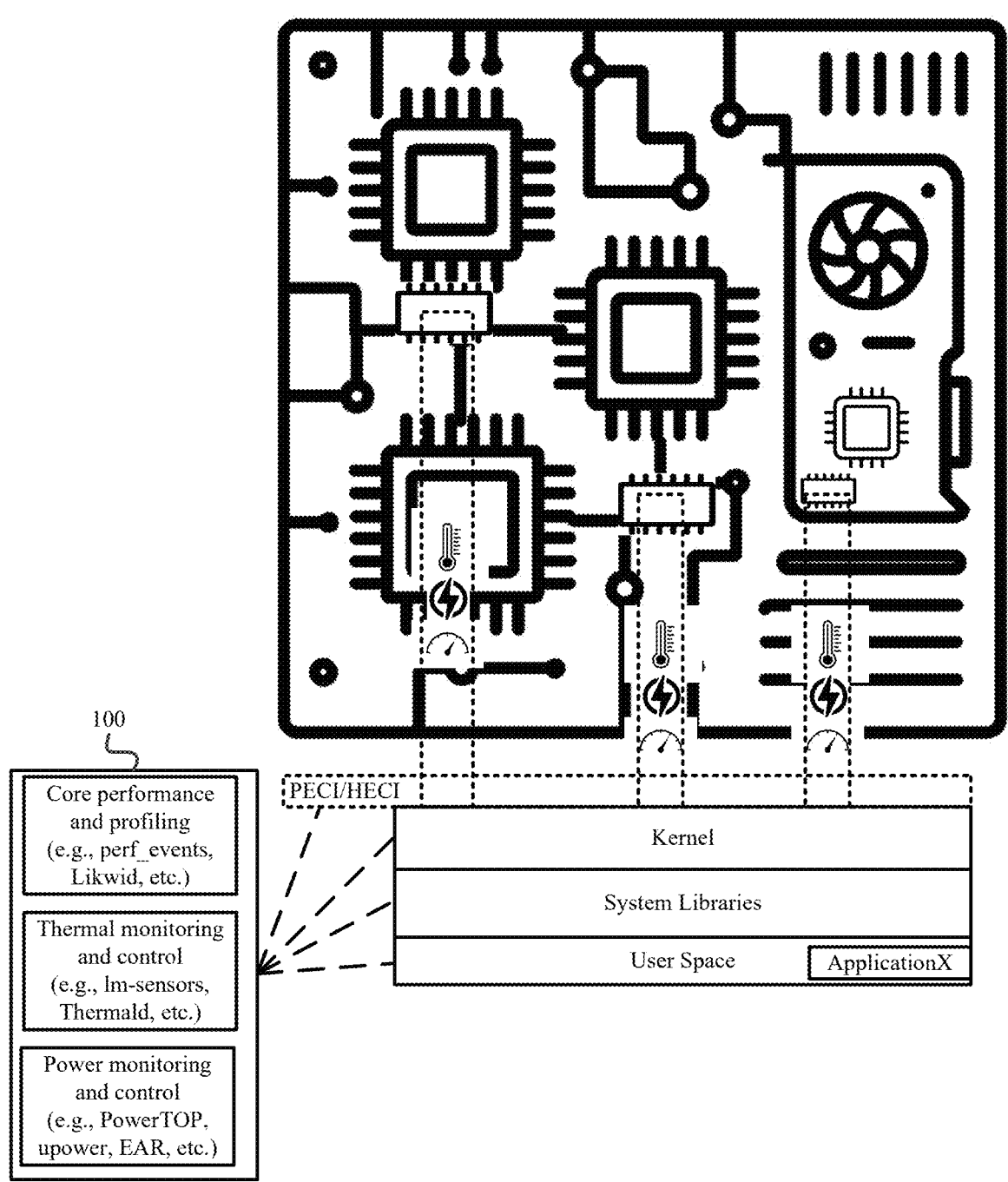
FIG. 9 illustrates an example architecture for the proactive and predictive power consumption reduction in accordance with some embodiments presented herein.

FIG. 9 illustrates an example architecture with which PPPMC 100 provides the proactive and predictive power consumption reduction in accordance with some embodiments presented herein. PPPMC 100 is installed and runs on a computing system with one or more processors, hardware, storage, network, fans or cooling units, power supply units (PSUs), and/or other hardware.

PPPMC 100 is an application that is integrated as part of the OS or kernel or runs as a standalone application running atop the OS. PPPMC 100 accesses various user-space tools and kernel interfaces to retrieve the telemetry data. Examples of the user-space tools include lm-sensors, PowerTOP, TLP, Thermald, and Energy-Aware Runtime (EAR) that PPPMC 100 may call or execute to monitor temperatures, voltages, and fan speeds, analyze power consumption, perform advanced power management, manage thermal zones, and/or optimize energy consumption based on workload usage. Examples of kernel interfaces include perf_events, PECI driver, and HECI driver that PPPMC 100 uses to monitor performance, expose PECI functionalities to the user space, and/or enable communication with the management engine or other integrated chipsets for thermal and power monitoring. PPPMC 100 also uses the kernel interfaces and/or system libraries to adjust power states and thermal settings of the processors, PSUs, fans, and/or other computing system hardware used to regulate processor operation.

Figure 10:
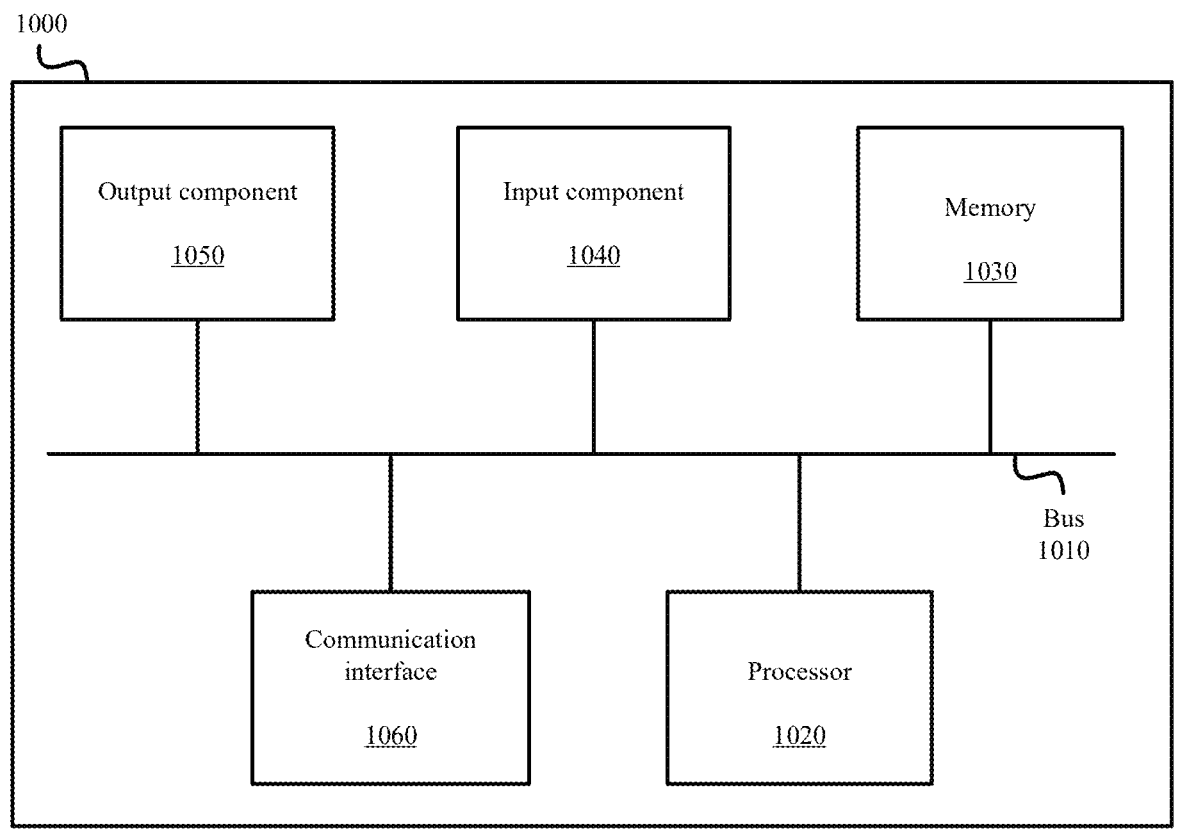
FIG. 10 illustrates example components of one or more devices, according to one or more embodiments described herein.

FIG. 10 is a diagram of example components of device 1000. Device 1000 may be used to implement one or more of the devices or systems described above (e.g., PPPMC 100, the computing system on which PPPMC 100 executes, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method for reducing power consumption during execution of a workload, the method comprising:

modeling utilization of a particular processor executing different workloads in a system comprising one or more processors based on telemetry data associated with the particular processor executing the different workloads;

deploying the workload to the particular processor;

determining that telemetry data associated with executing a first part of the workload matches the utilization of the particular processor executing a prior workload of the different workloads;

configuring dynamic thresholds for the particular processor based on the modeling of the utilization of the particular processor executing the prior workload, wherein configuring the dynamic thresholds comprises:

restricting the particular processor to an upper frequency that is less than a maximum frequency supported by the particular processor prior to the particular processor reaching a threshold at which the particular processor is throttled; and increasing one or more of an operating frequency or power consumption of the particular processor for a second part of the workload in response to a modeled subsequent part of the utilization of the particular processor executing the prior workload corresponding to an increase in workload demand; and executing the workload with the upper frequency of the particular processor restricted according to the dynamic thresholds.

2. The method of claim 1 further comprising:

gating one or more cores of the particular processor that are detected to execute low-utilization tasks or are idle based on the telemetry data, wherein gating the one or more cores comprises turning off power to the one or more cores.

3. The method of claim 2 further comprising:

detecting the one or more cores executing the low-utilization tasks or that are idle based on the telemetry data associated with the one or more cores comprising measurements of power consumption or core operating frequencies that do not exceed a specified threshold.

4. The method of claim 1 further comprising:

analyzing the telemetry data by determining different amounts of power used by the particular processor to complete a unit of work at different frequencies; and selecting the upper frequency for the dynamic thresholds to correspond to a frequency from the different frequencies that uses a least amount of power to complete the unit of work.

5. The method of claim 1, wherein the telemetry data comprises one or more measurements of temperature, power usage, operating frequency, or power state of the particular processor.

6. The method of claim 1 further comprising:

detecting that a temperature of the particular processor violates one of the dynamic thresholds and that there are no idle or unused cores of the particular processor; and shifting the workload from the particular processor to a second processor of the system based on telemetry data received for the second processor identifying one or more cores of the second processor being unused or idle.

7. The method of claim 1, wherein modeling the utilization comprises:

tracking power consumption of the particular processor during execution of the different workloads; and generating a predictive model based on recurring patterns within the power consumption of the particular processor during the execution of the different workloads.

8. The method of claim 1, wherein determining that the telemetry data matches the utilization of the prior workload comprises:

matching power consumption of the particular processor during execution of an initial part of the workload to an initial part of a particular usage pattern from the particular processor executing the prior workload; and wherein configuring the dynamic thresholds further comprises:

adjusting the dynamic thresholds based on power consumption associated with a subsequent part of the particular usage pattern.

9. The method of claim 1 further comprising:
connecting to one or more of a Platform Environment Control Interface (PECI) or a Host Embedded Controller Interface (HECI) of the system in order to receive the telemetry data.

10. The method of claim 1, wherein configuring the dynamic thresholds further comprises:
setting a dynamic voltage and frequency scaling (DVFS) configuration that restricts the upper frequency of the particular processor.

11. The method of claim 1 further comprising:
determining one or more used cores of the particular processor based on power consumption or operating frequency associated with the one or more used cores in the telemetry data being greater than power consumption or operating frequency associated with one or more under-utilized or unused cores of the particular processor in the telemetry data; and
shifting the workload from the one or more used cores to the one or more under-utilized or unused cores in response to a temperature of the particular processor violating a dynamic threshold of the dynamic thresholds.

12. The method of claim 1 further comprising:
shifting the workload from used cores of the particular processor to under-utilized or unused cores of the particular processor in response to a temperature of the particular processor violating a dynamic threshold of the dynamic thresholds; and
executing the workload across the under-utilized or unused cores according to the dynamic thresholds.

13. The method of claim 1 further comprising:
detecting two or more cores of the particular processor that execute at a utilization level that is less than a threshold;
shifting all tasks from the two or more cores of the particular processor to a particular core of the particular processor; and
deactivating the two or more cores that are not the particular core such that there is no power usage by the two or more cores.

14. A system comprising:
one or more processors; and
a proactive and predictive power management controller (PPPMC) that is configured to:
model utilization of a particular processor of the one or more processors executing different workloads based on telemetry data associated with the particular processor executing the different workloads;
deploy a workload to the particular processor;
determine that telemetry data associated with executing a first part of the workload matches the utilization of the particular processor executing a prior workload of the different workloads;
configure dynamic thresholds for the particular processor based on the modeling of the utilization of the particular processor executing the prior workload, wherein configuring the dynamic thresholds comprises:
restricting the particular processor to an upper frequency that is less than a maximum frequency supported by the particular processor prior to the particular processor reaching a threshold at which the particular processor is throttled; and
increasing one or more of an operating frequency or power consumption of the particular processor for a second part of the workload in response to a modeled subsequent part of the utilization of the particular processor executing the prior workload corresponding to an increase in workload demand; and
execute the workload with the upper frequency of the particular processor restricted according to the dynamic thresholds.

15. The system of claim 14, wherein the PPPMC is further configured to:
gate one or more cores of the particular processor that are detected to execute low-utilization tasks or are idle based on the telemetry data, wherein gating the one or more cores comprises turning off power to the one or more cores.

16. The system of claim 15, wherein the PPPMC is further configured to:
detect the one or more cores executing the low-utilization tasks or that are idle based on the telemetry data associated with the one or more cores comprising measurements of power consumption or core operating frequencies that do not exceed a specified threshold.

17. The system of claim 14, wherein the PPPMC is further configured to:
analyze the telemetry data by determining different amounts of power used by the particular processor to complete a unit of work at different frequencies; and
select the upper frequency for the dynamic thresholds to correspond to a frequency from the different frequencies that uses a least amount of power to complete the unit of work.

18. The system of claim 14, wherein the telemetry data comprises one or more measurements of temperature, power usage, operating frequency, or power state of the particular processor.

19. A non-transitory computer-readable medium storing program instructions that, when executed by one or more hardware processors of a system, cause the system to perform operations comprising:
modeling utilization of a particular processor of the one or more hardware processors executing different workloads based on telemetry data associated with the particular processor executing the different workloads;
deploying a workload to the particular processor;
determining that telemetry data associated with executing a first part of the workload matches the utilization of the particular processor executing a prior workload of the different workloads;
configuring dynamic thresholds for the particular processor based on the modeling of the utilization of the particular processor executing the prior workload, wherein configuring the dynamic thresholds comprises:
restricting the particular processor to an upper frequency that is less than a maximum frequency supported by the particular processor prior to the particular processor reaching a threshold at which the particular processor is throttled; and
increasing one or more of an operating frequency or power consumption of the particular processor for a second part of the workload in response to a modeled subsequent part of the utilization of the particular processor executing the prior workload corresponding to an increase in workload demand; and
executing the workload with the upper frequency of the particular processor restricted according to the dynamic thresholds.

* * * * *